(12) United States Patent
Tsujihama et al.

(10) Patent No.: US 8,033,380 B2
(45) Date of Patent: Oct. 11, 2011

(54) ASSEMBLY STAND, ASSEMBLY METHOD, AND PROCESS DISPLAY DEVICE FOR ARTICLE

(75) Inventors: Shingo Tsujihama, Tokyo (JP); Hitoshi Sasaki, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 634 days.

(21) Appl. No.: 11/579,797

(22) PCT Filed: May 12, 2005

(86) PCT No.: PCT/JP2005/008702
§ 371 (c)(1),
(2), (4) Date: Oct. 12, 2007

(87) PCT Pub. No.: WO2005/109134
PCT Pub. Date: Nov. 17, 2005

(65) Prior Publication Data
US 2008/0190737 A1    Aug. 14, 2008

(30) Foreign Application Priority Data

May 12, 2004 (JP) ............................... 2004-142516
Jul. 8, 2004 (JP) ............................... 2004-201840

(51) Int. Cl.
*B65G 47/24* (2006.01)
(52) U.S. Cl. ........................................................ 198/411
(58) Field of Classification Search .................. 198/411,
198/624, 803.16, 349, 464.1, 464.3, 502.3,
198/502.4, 793, 577, 575, 341.08, 341.09;
700/95, 230; 104/35, 37, 38, 44, 46
See application file for complete search history.

(56) References Cited

U.S. PATENT DOCUMENTS

| | | | | |
|---|---|---|---|---|
| 3,332,656 A * | 7/1967 | Johnson, Jr. et al. | ......... | 180/124 |
| 3,822,652 A * | 7/1974 | Burdick et al. | ............... | 108/139 |
| 4,449,986 A * | 5/1984 | Held | ............................. | 29/26 A |
| 4,608,929 A * | 9/1986 | Park | ................................. | 104/44 |
| 4,724,371 A * | 2/1988 | Ito et al. | ......................... | 318/603 |
| 5,086,704 A * | 2/1992 | Mueller | ........................... | 104/44 |
| 5,239,892 A * | 8/1993 | Sakai | .......................... | 74/813 L |
| 5,262,954 A * | 11/1993 | Fujino et al. | ................. | 700/112 |
| 5,271,490 A * | 12/1993 | Sticht | ............................. | 198/349 |
| 5,477,117 A * | 12/1995 | Saito | .......................... | 318/568.22 |

(Continued)

FOREIGN PATENT DOCUMENTS

CN    1041901    5/1990

(Continued)

OTHER PUBLICATIONS

Japanese Office Action issued for 2004-201840 on Mar. 10, 2009.

(Continued)

*Primary Examiner* — Gene Crawford
*Assistant Examiner* — William R Harp
(74) *Attorney, Agent, or Firm* — Smith, Gambrell & Russell, LLP

(57) ABSTRACT

Rather than simply changing a component or module to be installed, a conveyance speed of a conveyance means for conveying a workpiece is modified in response to the specifications of a product when a product with specifications modified in part from common specifications of mass produced products is added to the mass produced products. Furthermore, a condition wherein the speed of the conveyance means is modified in accordance with specifications is displayed in real time such that a worker can identify the condition.

2 Claims, 12 Drawing Sheets

U.S. PATENT DOCUMENTS

| | | | | |
|---|---|---|---|---|
| 5,500,717 | A * | 3/1996 | Altrieth, III | 399/83 |
| 5,950,503 | A * | 9/1999 | Amendolea | 74/813 R |
| 6,025,834 | A * | 2/2000 | Yamashita et al. | 345/173 |
| 6,224,385 | B1 * | 5/2001 | Nitta et al. | 434/219 |
| 6,477,437 | B1 * | 11/2002 | Hirota | 700/95 |
| 6,494,664 | B1 * | 12/2002 | Winter, Jr. | 414/401 |
| 6,497,320 | B2 * | 12/2002 | Kondo et al. | 198/502.3 |
| 7,092,771 | B2 * | 8/2006 | Retlich et al. | 700/72 |
| 7,208,944 | B2 * | 4/2007 | Tatschl et al. | 324/207.25 |
| 7,379,779 | B2 * | 5/2008 | Ekberg | 700/95 |
| 7,703,189 | B2 * | 4/2010 | Tsujihama et al. | 29/431 |

FOREIGN PATENT DOCUMENTS

| | | |
|---|---|---|
| JP | 58-129608 | 8/1983 |
| JP | 1-202586 | 8/1989 |
| JP | 4-302011 | 10/1992 |
| JP | 7-122891 | 5/1995 |
| JP | 7-129243 | 5/1995 |
| JP | 9-141531 | 6/1997 |
| JP | 11-90795 | 4/1999 |
| JP | 2000-78877 | 3/2000 |
| JP | 2002-36072 | 2/2002 |
| JP | 2003-263322 | 9/2003 |
| JP | 2004-86516 | 3/2004 |
| JP | 2004-291954 | 10/2004 |

OTHER PUBLICATIONS

Japanese Office Action issued for 2004-142516 on Apr. 21, 2009.

Chinese Office Action for Application No. 200580020062.8 issued on Nov. 11, 2009 with English language translation.

Supplemental Search Report for European Application No. 05 73 9117, dated, Mar. 25, 2010.

* cited by examiner

ASSEMBLY STAND, ASSEMBLY METHOD, AND PROCESS DISPLAY DEVICE FOR ARTICLE

TECHNICAL FIELD

The present invention relates to an assembly stand used in the assembly of mass produced articles, an assembly method making use thereof, and a process display device used therein. Although the present invention is for use in the assembly of vehicles, and of automobiles in particular, widespread usage thereof in the assembly of other mass produced articles is also possible.

BACKGROUND ART

Automobile manufacturing lines having a straight-line shape are widely known in the conventional technology. As an illustration thereof, individual processing areas are disposed at fixed intervals of, for example, between 10 and 20 meters in line with a processing sequence and along a manufacturing line setup with a straight-line shape. In a first processing area, an axle module is mounted on a vehicle frame having been introduced thereto. In a next processing area, this vehicle frame is temporarily hoisted up and turned upside-down, and in addition, an engine module, a transmission module, and the like are mounted thereon. In a next processing area, a fuel tank, an air tank, wiring, ducting, and the like are mounted on the vehicle frame chassis. Each time a workpiece passes through sequential processing areas in this way, new components and modules are added and mounted thereon, and the degree of completion of the workpiece as a vehicle becomes higher with each passage through a processing area. Generally, between ten and several tens of processing areas are provided along a manufacturing line, and in more specific terms, for example, 20 processing areas are provided. A system conveying an incomplete vehicle along the manufacturing line can be of a type whereby the entire line is conveyed at a slow, fixed speed, or of a type whereby a prescribed takt is set up and the incomplete workpiece is moved in steps and stopped within each processing area. In both of these cases, the operating duration during which a workpiece can be accessed in a single processing area of a manufacturing process for automobiles is between several and several tens of minutes, and for example, is 15 minutes. This time is known as the takt time. A driver boards the vehicle having been completed to a prescribed level, and the vehicle leaves the manufacturing line under its own propulsion from an end of a manufacturing line of this type.

The following is an explanation of the term "module" as used herein. The term "module" as used in this specification refers to a complex-form component constituting a single grouping assembled from a plurality of components, and the components and materials supplied to vehicle assembly processes are generally referred to as "modules". Typical examples of "modules" are an engine module, whereupon an engine and necessary related components have been mounted, and the wheels supplied to an incomplete vehicle constituting the subject of operations in a vehicle manufacturing process. Furthermore, the fuel and other liquids supplied to an almost-complete vehicle at a final stage of a manufacturing process are also considered to be a "module".

In contrast to the widely-implemented conventional manufacturing method as described above, the applicant of the present invention disclosed in patent document 1 a method of assembly of vehicles one (two, three, or another small number) at a time on a rotating assembly stand. In brief, the invention of patent document 1 constitutes a vehicle assembly method wherein a plurality of operations of supplying components proceed towards a single radial center and the supplied plurality of components are assembled to form a vehicle on a rotating assembly stand provided at the radial center. The gist of a device invention of the same application involves a vehicle assembly plant wherein a plurality of component supply areas are disposed in a radial pattern and a single rotating assembly stand is disposed at the radial center thereof, and providing a means for rotating that rotating assembly stand in line with the advancement of operations.

Taking the manufacture of a single truck as an example in order to supply a supplemental explanation regarding the invention of patent document 1, a disc-shaped rotating assembly stand is provided within the plant, and this rotating assembly stand is, for example, rotated at a constant speed so as to rotate once per hour, or in other words, is rotated at a constant speed of six degrees per minute. This rotating assembly stand is disc-shaped, having a diameter of, for example, between 10 and 20 meters. A plurality of module supply areas separated into substantially fan-shaped partitions are set up around that rotating assembly stand, and first of all, an axle module is delivered from a first module supply area to the rotating assembly stand. Next, a vehicle frame is delivered in a non-assembled condition from a second module supply area to this rotating assembly stand in line with the rotation thereof. This is then assembled above the axle module by a worker present on this rotating assembly stand, forming a vehicle frame. Next, the vehicle frame is mounted on the axle module. As time passes, the rotating assembly stand rotates further, and an engine module is delivered from a third module supply area, suspended in the vicinity of a front end of the vehicle frame, and mounted.

Next, a tank and piping are delivered from a fourth module supply area, and these are mounted on various vehicle components. A cab is delivered from a fifth module supply area and is mounted at a front-end section of the vehicle frame so as to cover the engine module. Various connections are made between equipment required for driving and mounted in the cab and mechanical equipment mounted on the engine module. The rotating assembly stand rotates further, and fuel, lubricating oil, and other liquids are supplied from a sixth module supply area and charged to various sections of the vehicle, now approaching completion. Furthermore, the wheels and hood are delivered from a seventh module supply area and each is mounted on the vehicle. Assembly operations reach a state of near completion when the rotating assembly stand rotates even further and the front-end section of the vehicle being assembled reaches the position of a final module supply area, and at that time, inspection devices are connected to the vehicle, the engine thereof having been started, and various inspections are carried out. The rotation position of the rotating assembly stand upon the completion of these inspections is such that the front-end section of the vehicle exactly opposes a removal path for a completed vehicle. A driver boards the vehicle and sits in the driver's seat thereof, and this vehicle leaves the rotating assembly stand under its own propulsion. When the rotating assembly stand rotates further, assembly of a next vehicle begins. That is to say, the rotating assembly stand opposes the first module supply area and an axle module is delivered.

As the new manufacturing method disclosed in patent document 1 manufactures vehicles one (two, three, or another small number) at a time in this way, the number of vehicles retained inside the plant as work-in-process and the corresponding time is markedly reduced. It has been learned that as a result thereof, significant benefits are seen in terms of interest borne in the form of work-in-process. In addition to benefits related to interest burden in the form of work-in-process, numerous other economic merits are realized through the practicing of the invention of patent document 1, and this system has been put to practical use for large-size or medium-size vehicles in a manufacturing plant of the applicant of the present invention.

Furthermore, the Kanban (signboard) system is known as a system of providing information and instruction to workers performing operations in a manufacturing process. The Kanban system is used when the specifications of a workpiece manufactured on a single manufacturing line change slightly with each unit. If the specifications of a vehicle, constituting a workpiece introduced into a single manufacturing line, are all identical, operations of fitting identical components or modules are performed repeatedly in a preset manner in all processing areas on workpieces arriving one-by-one at intervals of the takt time. In actual automobile manufacturing processes, however, specifications change slightly with each successive vehicle, even if it is assumed that all manufactured vehicles are of an identical model. In the Kanban system, a signboard is set up on a vehicle frame when the frame is introduced from the beginning of the manufacturing line. When a specific component with different specifications must be fitted as part of the fitted components, the corresponding specified specifications are displayed on this signboard so as to be easily understood by workers.

Furthermore, a mode of disposing lightning signboards in the vicinity of such a manufacturing line so as to be easily seen by workers performing operations on the manufacturing line is known in the conventional technology. These conventional lightning signboards are, for example, rectangular signboards with a landscape orientation and suspended from a ceiling so as to be capable of being commonly seen by workers from a plurality of operating process positions. Such signboards differ little from those located on platforms and at ticket barriers in departure stations of major railways, etc. and displaying messages such as, "Next train on Line x: Special Express No. yy, departing at hh:mm for zz". The current takt-time setting (i.e., the duration that a workpiece can spend in a single processing area) and the degree to which that takt time has elapsed at the current point in time, in addition to the planned production volume for the current day, the actual number thereof completed, and other such details are displayed on these lightning signboards. In the event that a manufacturing line is stopped unexpectedly, some display the reason for the stoppage and the expected duration until recovery. Other information and instructions to be commonly supplied to a plurality of workers can also be displayed on this type of lightning signboard. The display content of conventional lightning signboards is, as a fundamental principle, modified and controlled through the operation of a manager in the plant's control room.

As background technology relating to lightning indication, patent document 2 and patent document 3 disclose a device monitoring and recording error information of manufacturing equipment under program control. Furthermore, a display device for reducing declines in capacity utilization with respect to human-induced manufacturing equipment errors is disclosed in patent document 4.

| Patent document 1: | JP 2004-291954A |
| Patent document 2: | JP 2003-263322A |
| Patent document 3: | JP 11-090795A |
| Patent document 4: | JP 9-141531A |

DISCLOSURE OF INVENTION

Problem to be Solved by the Invention

In a conventional manufacturing line continuously manufacturing a large number of products of identical specifications, modification of a speed of conveyance of the manufacturing line is not carried out in response to the specifications of the workpiece. As explained with respect to the above-described Kanban system, care is taken such that a duration of operations executed in the various processing areas set along the manufacturing line is uniform, even if there exists a portion of the specifications that differs from the standard specifications, and increases or decreases in the operating duration as a result of specifications differing from the standard specifications are absorbed. As a result of this, a takt time or conveyance speed is set to a standard value within an allowable range of variation in the operating duration in accordance with a manufacturing volume target set for the day in question.

However, in order that absorption of increases or decreases in the operating duration can be carried out, it is necessary to confirm in advance that sufficient time reserve is available therefor. Although that is acceptable in cases where the frequency of specifications requiring an extended operating duration is high, the making available of a time reserve is not preferable for specifications with a low frequency.

It is an object of the present invention to resolve this type of problem and to provide an assembly stand and assembly method for articles allowing process operations to be carried out in an unwasteful and efficient manner. It is a further object of this invention to provide a process display device for use with such an assembly stand and assembly method.

Means for Solving Problem

According to a first aspect of the present invention, an assembly stand for articles comprises a means for conveying a workpiece in accordance with progress of a process operation, and a means for setting in a variable manner a conveyance speed of the conveyance means depending on a specification of the conveyed workpiece.

It is preferable that the assembly stand for articles comprises one or a plurality of optical display means set up in the vicinity of the conveyance means, or in other words, at a position easily seen by a worker involved in a process operation, and a display control means for controlling information displayed on the display means, and the display control means comprises a means for reading motion position information of the conveyance means and for displaying the position information on the display means. In this case, it is preferable that an operation means for providing operation input from the vicinity of the conveyance means to the display control means be provided. A touch panel area can be provided on a display screen of the display means as the operation means.

It is preferable that the display control means comprises a means for recording at least a portion of the motion position information of the conveyance means and the information displayed on the display means together with time information.

It is preferable that the display means be disposed in a position easily seen even from an operation area supplying a component or a module to the conveyance means, and that the display control means comprise a means for displaying information on each display means such that a worker present in a corresponding operation area can identify a start time for preparation of a component or a module and a specification of the component or module to be prepared.

It is preferable that an abnormality display area be set up in the display means, and that the display control means comprise a means for displaying a cause of stoppage in the abnormality display area when operation of the conveyance means stops unexpectedly.

It is preferable that the means for setting comprise a sensor means for detecting a position of the conveyance means, and a conveyance control means for controlling in a programmable manner a speed of the conveyance means based on output information of the sensor means and specification information of the workpiece.

It is preferable that the conveyance means be disc shaped, that one or a small number of workpieces be disposed on the disc-shaped conveyance means, and that the conveyance means be set such that an operation is executed to a prescribed degree of completion during substantially one revolution thereof. In this case, the means for setting can comprises a sensor means for detecting a rotation angle of the conveyance means, and a conveyance control means for controlling in a programmable manner a speed of rotation of the conveyance means based on output information of the sensor means and specification information of the workpiece. The sensor means can comprise a means for detecting rotation of the conveyance means and for generating pulse information, and the output information of the sensor means can be configured so as to comprise a time integration value of the pulse information thereof. It is preferable that a means for resetting the time integration value at a datum point set in advance in terms of a rotation angle of the conveyance means be provided.

The conveyance control means can comprise a means for setting a rotation speed of the conveyance means in accordance with a rotation angle thereof. Specifically, the rotation speed of the assembly stand is set to a small value or zero at the timing at which a module of a workpiece is delivered to the rotating stand, and the rotation speed of the assembly stand is set to a large value at the timing of mounting of the module on the workpiece.

Specification information of the workpiece can be acquired from a host device.

The disc-shaped conveyance means can comprise a disc of a construction whereupon a workpiece can be mounted, a bearing supporting a central axis of the disc, a plurality of air mats blowing high-pressure air from a bottom surface of the disc and raising the disc, a motor driving rotation of the disc about the central axis, and a drive circuit supplying drive current to the motor, and the means of setting can comprise a control circuit controlling the drive current output by the drive circuit.

According to a second aspect of the present invention, an assembly method for articles is provided that involves disposing a workpiece on an assembly stand, advancing an assembly operation of the workpiece while delivering a module onto the assembly stand from a module supply area set up at a circumference of the assembly stand, and performing an assembly operation of the workpiece to a prescribed level during a prescribed motion of the assembly stand, and is characterized in that a motion speed of the assembly stand is controlled in a variable manner based on a specification of the workpiece. It is preferable that the assembly stand be disc shaped and that a rotation speed of the disc-shaped assembly stand be controlled in a variable manner.

According to a third aspect of the present invention, a process display device having one or a plurality of optical display means in the vicinity of a conveyance means moving a workpiece in accordance with progress of a process operation is provided that is characterized in that the conveyance means wherein a conveyance speed thereof is set in a variable manner based on a specification of the conveyed workpiece comprises a display control means for controlling information displayed on the display means, and the display control means comprises a means for reading motion position information of the conveyance means and for displaying the position information on the display means.

Effects of the Invention

In accordance with the present invention, assembly operations of each of a plurality of products with different specifications can be carried out with a reasonable operation time using a single assembly stand. In accordance with the present invention, a position on the assembly stand whereto a module is delivered from a module supply area is automatically controlled to an optimum position for each operation process on the assembly stand. In accordance with the present invention, operations can be carried out reasonably, properly, and according to a manufacturing plan on a rotating assembly stand, without any advancement or termination of operations by a worker based on a desire or convenience thereof. The assembly stand for vehicle assembly of the present invention has a configuration achieved after making numerous improvements as a result of prototype testing, and endures practical use upon implementation as is.

Furthermore, as a result of reading in of motion position information of the conveyance means and displaying of that position information, when the speed of conveyance (speed of transportation or timing of transportation) of the conveyance means (line or rotating disc) is set in a variable manner, workers can correctly identify this and can perform reasonable time allocation with little waste and can advance operations. As a result of this display, individual workers carrying out processes can correctly identify the overall situation and perform operations, and therefore, actions are optimized without instructions having to be received one by one, and overall, process stoppage time is reduced and operation effectiveness is improved. By using this display, worker fatigue is reduced and operation efficiency is improved. From this display content, workers can identify overall conditions and advance operations. Display content is automatically saved as is as records, and this can prove useful later on when properly resolving inconvenient problems having occurred in a process.

DESCRIPTION OF REFERENCE NUMERALS

Figure 1:
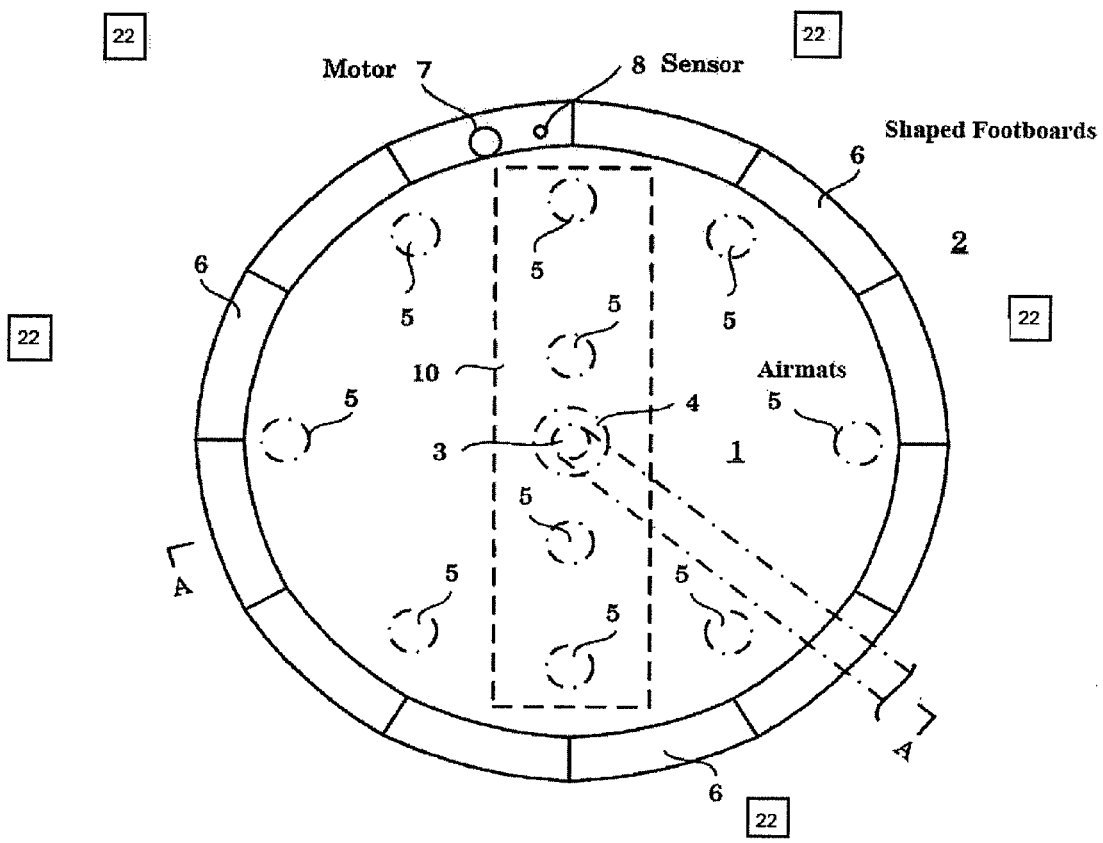
FIG. 1 shows a plan view of the essential parts of a rotating assembly stand according to an embodiment of the present invention.

1. Disc
2. Floor surface
3. Bearing
4. Cylindrical cavity
5. Air mat
6. Footboard
7. Motor
8. Sensor
10. Vehicle being assembled
12. Control circuit
13. Display and control panel
14. Drive circuit
15. Host device
16. Air-pressure control valve
21. Display control section
22. Process display device

BEST MODE FOR CARRYING OUT THE INVENTION

In the straight-line shaped manufacturing line described above as an example of the conventional technology, a line conveyor moves in a simultaneous manner with respect to all module supply areas or operation areas disposed along the line, and therefore, design must be carried out such that operation man-hours in all operation areas are uniform. In a system put to more widespread use wherein a conveyor is driven intermittently in accordance with a takt, a longitudinal distance of operation areas disposed along a line cannot be distributed and set on an individual basis, and therefore, operations must be precisely distributed in order that the operation man-hours per unit in each operation area are uniform. As non-uniformity of operation man-hours is unavoidable when manufacturing models of various types, this results in waste. From this perspective, assembly using a rotating assembly stand is remarkably advantageous.

Furthermore, when a rotating assembly stand as disclosed in patent document 1 is installed in a plant, the setting of a variety of models capable of being manufactured using this rotating assembly stand is economically advantageous. This can be supported by the variable setting of a rotation speed of the rotating assembly stand in accordance with the model being manufactured. That is to say, in a manufacturing method using a rotating assembly stand, assembly of a vehicle is, as a fundamental principle, completed to a set degree of completion while the rotating assembly stand makes one revolution, and therefore, through modification of the rotation speed of the rotating assembly stand, such a manufacturing method holds promise of reasonable and economical support for vehicles having different specifications, or in other words, having different assembly man-hours.

The technical concept presented herein of setting the speed of rotation of the rotating assembly stand in a variable manner encapsulates two ideas. The first thereof is an idea of setting the time required for one rotation of the rotating assembly stand in a variable manner. For example, this corresponds to the concept of assembling a vehicle either in 60 minutes (an average rotation speed of 6 degrees per minute) or in 40 minutes (an average rotation speed of 9 degrees per minute). The second thereof is an idea of fine division and setting in a variable manner of those rotation speeds also during one rotation of the rotating assembly stand. For example, this corresponds to the concept of setting a rotation speed of the rotating assembly stand at 6 degrees per minute when assembling a frame, and setting a rotation speed of the rotating assembly stand at 9 degrees per minute when assembling an engine. Both of these concepts are incorporated in the present invention in order to achieve a more reasonable vehicle assembly process.

In terms of total operation man-hours, a large-size vehicle is, for example, assembled in 60 minutes, and a medium-size vehicle is, for example, assembled in 40 minutes. Accordingly, a process is designed so as to set an average rotation speed of 6 degrees per minute in the case of large-size vehicles, and set to an average rotation speed of 9 degrees per minute in the case of medium-size vehicles. However, module supply areas set up around the circumference of the rotating assembly stand cannot be configured so as to move when required, and support for this by finely modifying and controlling the speed of rotation during the course of one rotation in accordance with the specifications of the article to be manufactured was considered. Different durations are required for frame assembly on a rotating assembly stand of, for example, large-size vehicles having long frames and medium-size vehicles having relatively short frames. Assuming that the rotation speed of the rotating assembly stand is controlled so as to be constant at a speed set corresponding to the above-described average rotation speed, in the case of a large-size vehicle, a frame is delivered onto the rotating assembly stand, and while the assembly operation thereof remains incomplete, the rotating assembly stand continues to rotate so as to come to oppose a module supply area wherein an engine has been prepared. A similar occurrence takes place in a process of mounting the engine in the vehicle. The specifications of mounted engines vary widely with different models, and when engine specifications are different, the numbers of pipes and wires to be connected as part of engine mounting also differ. That is to say, the operating duration suitable for engine mounting differs with respect to the model. The idea of finely modifying the rotation speed of the rotating assembly stand in accordance with the model was thus conceived.

Meanwhile, arbitrary modification of the rotation speed of the rotating assembly stand by workers according to the individual conveniences thereof is not reasonable in mass production processes for articles. Even if the rotation speed is capable of being changed, this should be controlled in line with a process mass-production plan set reasonably and in advance, and with the exception of special situations such as the unexpected occurrence of accidents, the rotation speed should not be controllable as required by workers in accordance with the work thereof. Furthermore, although modification of this rotation speed can also be addressed through modification of an angle of rotation per minute while maintaining uniformity of the overall speed of rotation, in consideration of the duration of opposition of the module delivery position of the rotating assembly stand to the individual module supply areas, it is reasonable that that rotation speed be finely modified and set during the course of one rotation.

From this perspective, an embodiment of the present invention using a rotating assembly stand is explained hereinafter.

EMBODIMENT 1

Figure 2:
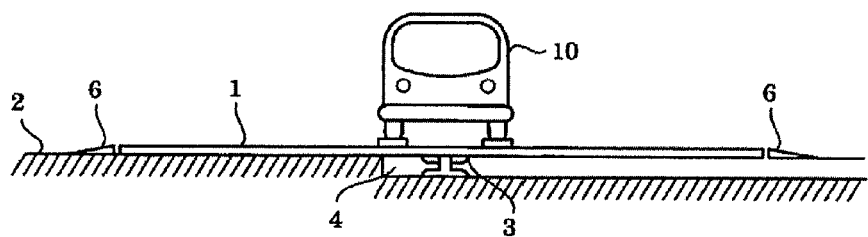
FIG. 2 shows a front elevation of the essential parts of a rotating assembly stand according to an embodiment of the present invention.
Figure 3:
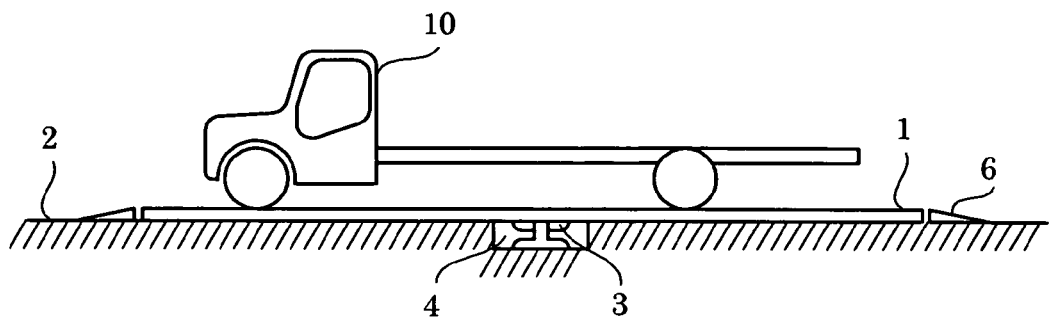
FIG. 3 shows a side view of the essential parts of a rotating assembly stand according to an embodiment of the present invention.

FIG. 1 is a plan view of a rotating assembly stand according to an embodiment of the present invention. FIG. 2 is a front elevation thereof. FIG. 3 is a side view thereof The hatched section of FIG. 2 shows a floor cross-section view along A-A shown in FIG. 1. The hatched section of FIG. 3 shows a floor cross-section view.

Disc 1 is of steel construction and is mounted on concrete floor surface 2 formed within a plant so as to be level and horizontal. A diameter of disc 1 is approximately 12 meters. Disc 1 has a central axis at the center thereof, and this central axis projects from a bottom-surface side of disc 1 with an orientation perpendicular thereto and is supported in a vertical direction by bearing 3. This bearing 3 supports the central axis of disc 1 so as to be capable of rotating freely inside cylindrical cavity 4 dug several tens of centimeters into a floor surface, and furthermore, allows a backlash of several millimeters in a direction of that central axis. A bottom section of cylindrical cavity 4 is formed with sufficient solidity so as to be capable of supporting a weight of a vehicle to be assembled and repeated usage. Furthermore, air mat 5 is disposed within a hollow formed by hollowing out the floor surface in a substantially cylindrical shape at each position indicated by a chain-line circle marking in FIG. 1, for a total of approximately 10 air mats 5.

Compressed air is delivered to air mats 5 through conduits (not shown). Air pressure of blow-out thereof is supplied so as to lift a rear surface of disc 1 in an upward direction, and as a result of this air pressure, disc 1 is floated above the floor surface. Bearing 3 and air mats 5 are commercial items procured for use as components of this device, and the construction of that bearing and air mats comprise no elements constituting a new invention. A total of 16 arc-shaped footboards 6 (steel construction) are disposed on the floor surface around disc 1. Each of footboards 6 is secured to the floor surface. These are disposed so as to facilitate convenient relocation of persons, equipment, and materials from the floor surface to the top of disc 1 or from the top of disc 1 to the floor surface across a difference in levels occurring between disc 1 and the floor surface.

Vehicle 10 constituting an article to be processed is disposed in a position shown by a dotted line in FIG. 1. A simple representation of a shape thereof is shown in each of FIG. 2 and FIG. 3. As explained above, when air pressure is delivered to air mats 5, disc 1, together with the vehicle, becomes raised slightly (between several millimeters and 10 to 20 millimeters). Motor 7 is disposed at a circumference of disc 1. A rotating shaft pulley of motor 7 is set up so as to contact the disc, and gently rotates disc 1 about the central axis. A black and white stripe pattern is rendered on a circumference of disc 1 at even intervals, and sensor 8 is configured so as to detect this using an optical signal and to calculate a speed of rotation. Although the vehicle, constituting an article to be processed and mounted on disc 1, is at first light, the weight thereof increases as processing proceeds. The total weight becomes several tons in a state near to completion; however, it should be noted that the delivered air pressure is adjusted and set such that disc 1 is elevated from the floor and capable of rotating freely even in this state.

Parallel lines comprising chain single-dashed lines rendered downward and to the right of a central position of FIG. 1 constitute a channel formed in a concrete surface. A power line for motor 7, a signal line for sensor 8, and piping for the air pressure delivered to air mats 5, etc. are disposed inside this channel. Several other channels are also formed in the floor surface whereupon disc 1 is mounted, and although signal lines and air-pressure piping to individual air mats 5 are disposed using these, inclusion of the conduits for individual lines and pipes would make the figure complicated, and accordingly, they are omitted.

Figure 4:
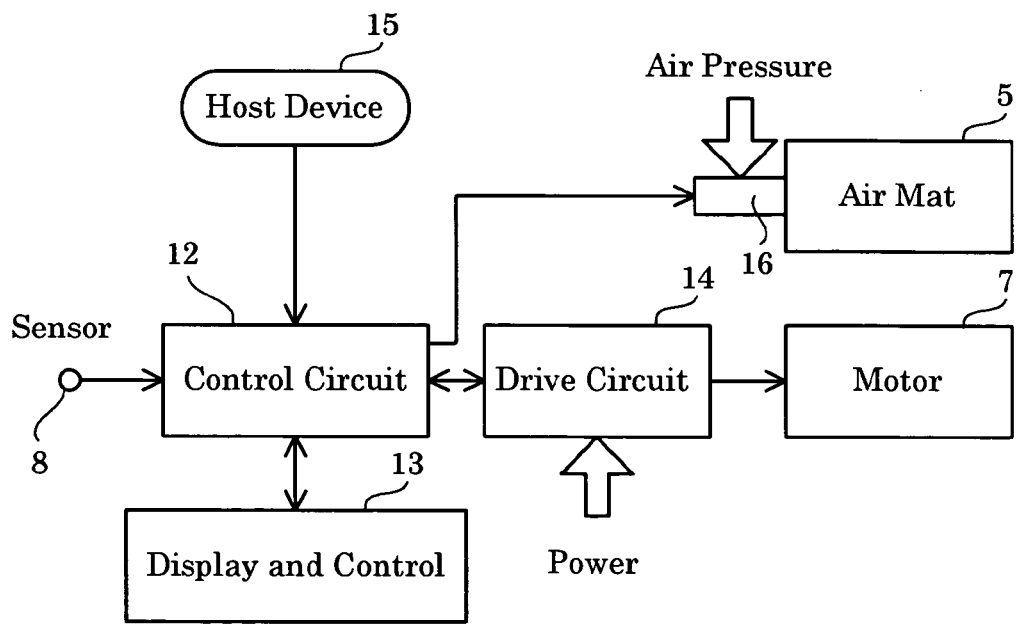
FIG. 4 shows a block configuration diagram of a control system of a device according to an embodiment of the present invention.

FIG. 4 is a block configuration diagram illustrating an electrical system of a device according to an embodiment of the present invention. Control circuit 12 is a program control circuit comprising an integrated circuit. A rotation pulse of disc 1 is input into control circuit 12 from sensor 8 explained above. Furthermore, information relating to the specifications of the vehicle to be operated upon on top of this rotating assembly stand is input from host device 15 through a communication line. Control circuit 12 is connected electrically to display and control panel 13. Display and control panel 13 is disposed in an easily-seen position in the vicinity of this rotating assembly stand. A control output of control circuit 12 is sent to drive circuit 14 and to air-pressure control valve 16 of air mats 5. Drive circuit 14 supplies power to motor 7 driving rotation of the aforementioned disc.

Figure 5:
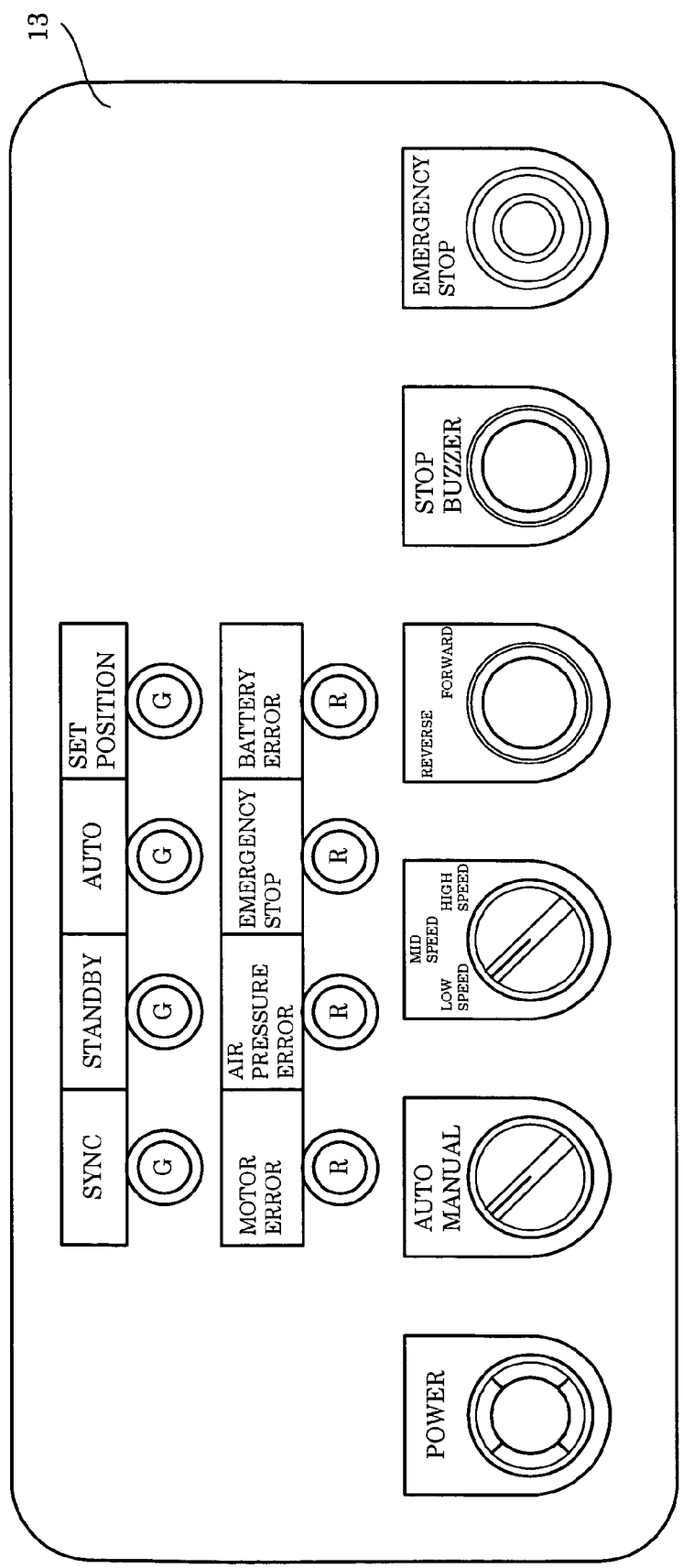
FIG. 5 shows a front elevation of the essential parts of a display and control panel according to an embodiment of the present invention.

FIG. 5 is a front elevation of a display and control panel according to an embodiment of the present invention. Display and control panel 13 is disposed at a top end of a stand of an appropriate height disposed on the floor surface. A bottom row of display and control panel 13 comprises switches. A power switch, an auto/manual selector switch, a speed adjuster switch (for manual mode), a rotation direction selector switch, a buzzer cancellation switch, and an emergency stop switch are arranged from the left. An upper row comprises display lamps, G indicating lamps lighting in green, and R indicating lamps lighting in red. Display lamps lighting in green indicate the current mode, and are, from the left, a synchronous operation lamp, a standby lamp, an automatic operation lamp, and a set position lamp. Red lamps light in the event of an abnormality and display the cause thereof. Displayed abnormalities are, from the left, motor error, air pressure error, emergency stop condition, and auxiliary power battery error.

The operation modes of this device are each set as numerical data in accordance with the specifications of the individual vehicle being assembled. Rotating speed modes of the rotating assembly stand for several tens of vehicle specifications were precisely programmed and saved during test operation, and the device was configured such that settings are made by selecting one thereof. This selection and setting is performed in response to the content of a sign of the so-called Kanban system. The Kanban system is a system for manufacturing those mass-produced products with specifications that change slightly among units, and furthermore, is a manufacturing control system whereby a sign is applied to workpieces traveling on a conveyor and workers are thus made aware of the changing points of the specifications thereof. The Kanban system is well known, and therefore, will not be explained herein.

Figure 6:
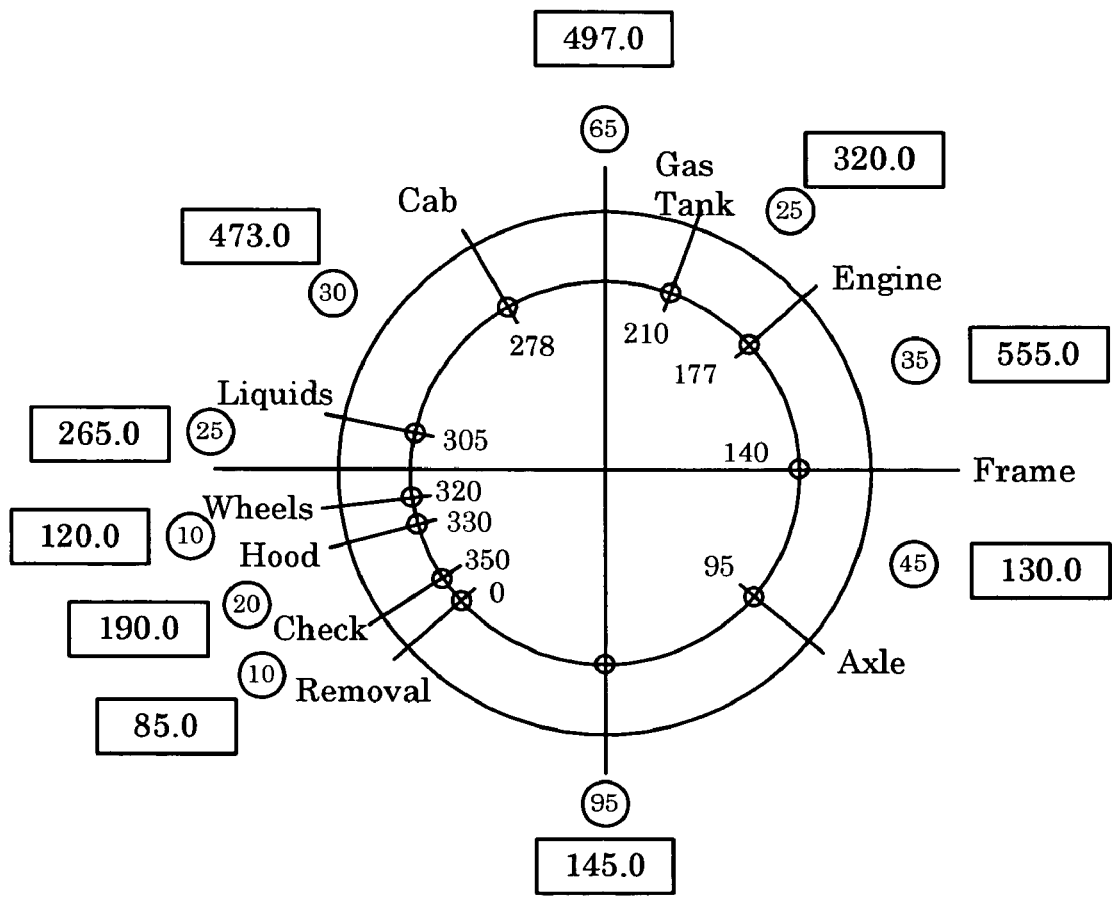
FIG. 6 illustrates an operation corresponding to a rotation angle of a rotating assembly stand according to an embodiment of the present invention.

FIG. 6 shows an example of a rotation pattern of the rotating assembly stand corresponding to assembly of a medium-size vehicle performed during test operation. In FIG. 6, the numbers positioned on the inside of the inner circle indicate absolute values of an angle of rotation (0 to 360 degrees) of disc 1 of the rotating assembly stand. The zero point of these angles of rotation is set at the position of a vehicle exit, axle assembly operations are performed on the rotating assembly stand during the period of rotation thereof from 0 to 95 degrees. Next, frame assembly operations are performed between rotation angles of 95 and 140 degrees. Next, engine mounting operations are performed between rotation angles of 140 and 177 degrees. Next, a tank, etc. is mounted between rotation angles of 177 and 210 degrees.

In this way, cab mounting operations (210 to 278 degrees), liquid charging operations (278 to 305 degrees), tire mounting operations (305 to 320 degrees), and hood mounting operations (320 to 330 degrees) are subsequently performed during periods corresponding to the rotation angles shown in parentheses while rotating the rotating assembly stand. Then, as a final process, the vehicle for which assembly has been almost completed is inspected in the rotation section between angles of rotation of 330 and 360 degrees. In addition to visual examination of various items, wires and probes are carried onto the rotating assembly stand, these are connected electrically to various sections of the vehicle being assembled, and the prescribed check is carried out. After the completion of the check, a driver boards and drives the vehicle, and the vehicle leaves this rotating assembly stand under its own propulsion.

The numbers enclosed in circles in FIG. 6 show angular spans. For example, assembly operations for the axle are carried out between rotation angles of 0 and 95 degrees, and the angular span thereof is 95 degrees. Assembly operations for the frame are carried out between rotation angles of 95 and 140 degrees, and the angular span thereof is 45 degrees. Accordingly, when all of the numbers in circles are added, they amount to 360 degrees (one rotation). The numbers enclosed in square frames in FIG. 6 show time durations (in seconds). The duration of assembly operations for the axle is shown to be 145 seconds. The duration of assembly operations for the frame is 130 seconds. Accordingly, the summed total of all numbers enclosed in square frames indicates the total time required for assembly operations for one vehicle. Incidentally, the summed total of all numbers enclosed in square frames in FIG. 6 is 2780.0 seconds, or in other words, 46 minutes and 20 seconds.

In the method and device of the present invention, the speed of rotation is not uniform, even within a section wherein a single step is processed, and the present invention is further characterized in that more precise control of the speed of rotation is carried out.

Figure 7:
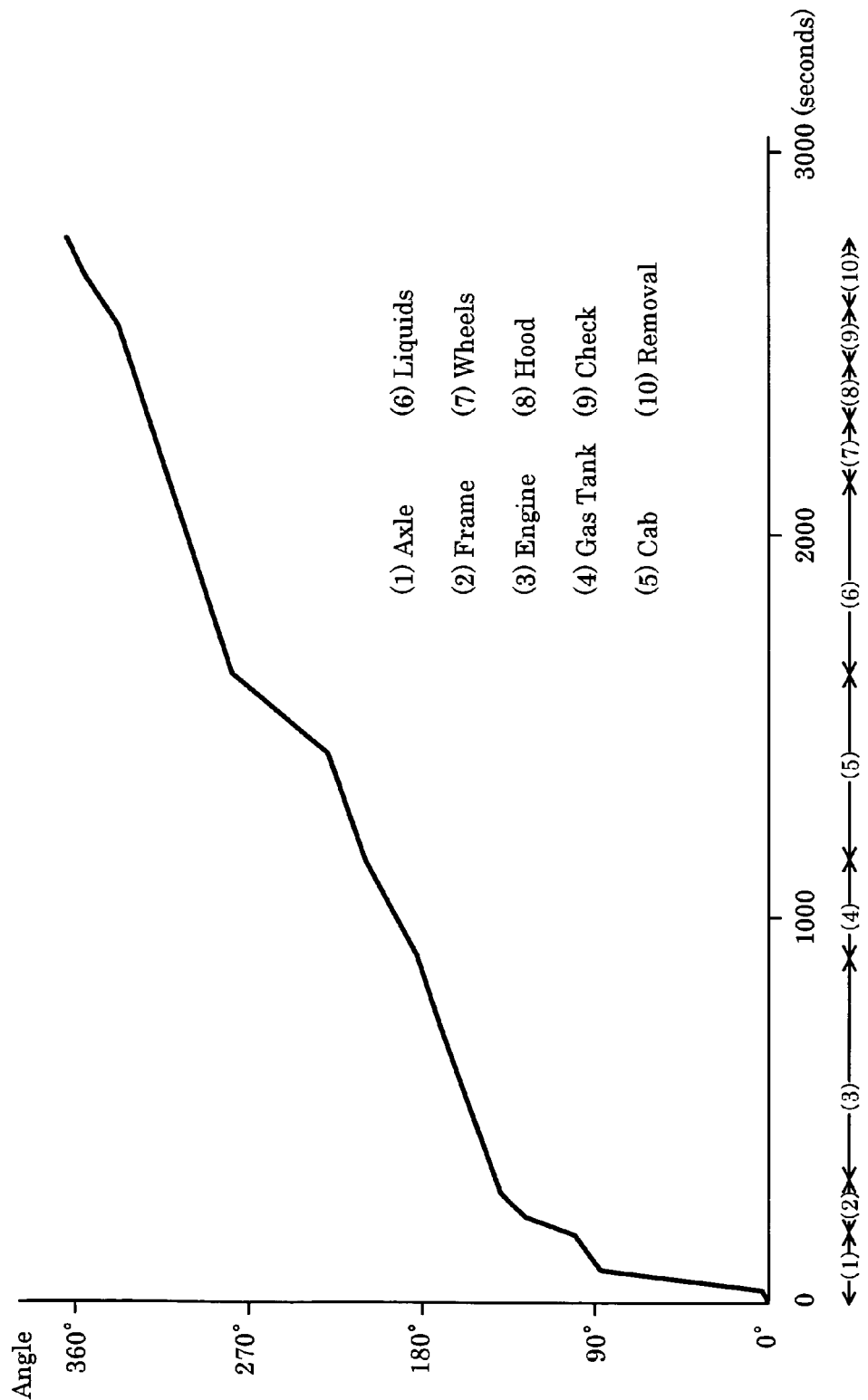
FIG. 7 shows an analog representation of rotation control information entered into a device according to an embodiment of the present invention.

FIG. 7 is a view showing angles of rotation corresponding to passage of the aforementioned time of 2,780 seconds, or in other words, 46 minutes and 20 seconds. This displays a table for input and setting of numerical data of control circuit 12 explained above in graph format in order to facilitate convenient and quantitative understanding thereof. Time is shown on the horizontal axis, and extends from 0 seconds to 2,780 seconds. The angle of rotation of the rotating assembly stand (disc 1) is shown on the vertical axis, and extends from 0 to 360 degrees. Details of each process operation are displayed as numbers in parentheses on the horizontal axis (elapsed time) of FIG. 7. That is to say, the speed of rotation of the rotating assembly stand of the present invention is precisely program controlled so as to realize reasonable support for each specific operation, even within a single operating process.

Figure 8:
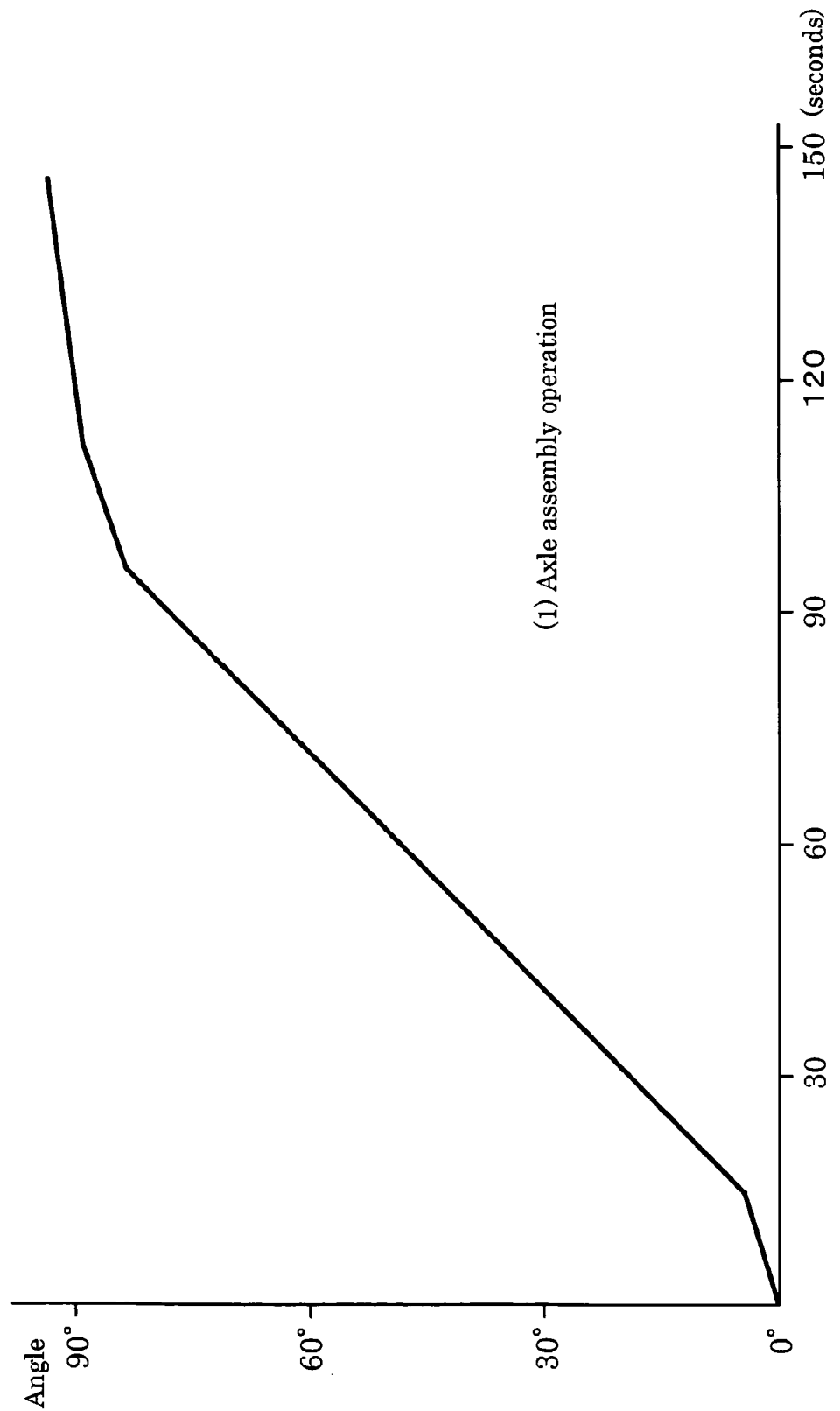
FIG. 8 shows an expanded view of a first section of FIG. 7.

FIG. 8 is an expanded view of the first portion thereof, or in other words, the portion corresponding to Operation (1) of FIG. 7. Using this as an example, the figure shows an enlargement of the relationship between this progress of time and angle of rotation in terms of axle assembly operations between rotation angles of 0 and 95 degrees. Although repeating the above, FIG. 8 also displays a table for setting of numerical data of control circuit 12 in graph format in order to facilitate convenient and quantitative understanding thereof. Axle assembly operations are, as described above, carried out in the period of time of 145 seconds between angles of rotation of the rotating assembly stand of 0 and 95 degrees, and FIG. 8 displays this portion with passage of time on the horizontal axis and angle of rotation on the vertical axis. An inclination of this graph represents the speed of rotation of the rotating assembly stand. That is to say, at a start point whereat these operations are started, all components, materials, and tools required for axle assembly operations on the rotating assembly stand are delivered from a module supply area onto this rotating assembly stand. For this reason, the speed of rotation of the rotating assembly stand is controlled so as to be temporarily extremely slow. During the period wherein assembly operations take place, the rotating assembly stand is rotated at a relatively high speed such that a delivery edge whereto equipment and materials are delivered in the next process arrives at a position exactly opposing the corresponding module supply area. Then, at the point at which axle assembly operations are completed, the speed of rotation thereof is gradually lowered, and transition to the next process takes place. The transition point of the next process is positioned at an angle of 95 degrees, where 145 seconds have passed since the start of rotation.

FIG. 7 and FIG. 8 as explained above are examples, and no display or explanation regarding examples of other models are given herein. In reality, similar control patterns have been designed and prepared for several tens of vehicle specifications. All of these are numerical data and are input into the program control circuit.

Although an explanation was given herein regarding automobiles or vehicles, assembly operations using this rotating assembly stand are not restricted to vehicles and can be widely implemented.

EMBODIMENT 2

As the motion speed of the assembly stand is variably controlled in accordance with the specifications of the workpiece in the present invention, there is a need for the required instructions to be given to workers in real time as process operations proceed. Furthermore, there is also a need for workers to input a suitable response with respect to the display of the process display device. Process display devices used previously are insufficient for these purposes. As embodiment resolving these issues will be explained hereinafter by way of an example of implementation together with the rotating assembly stand of Embodiment 1.

Figure 9:
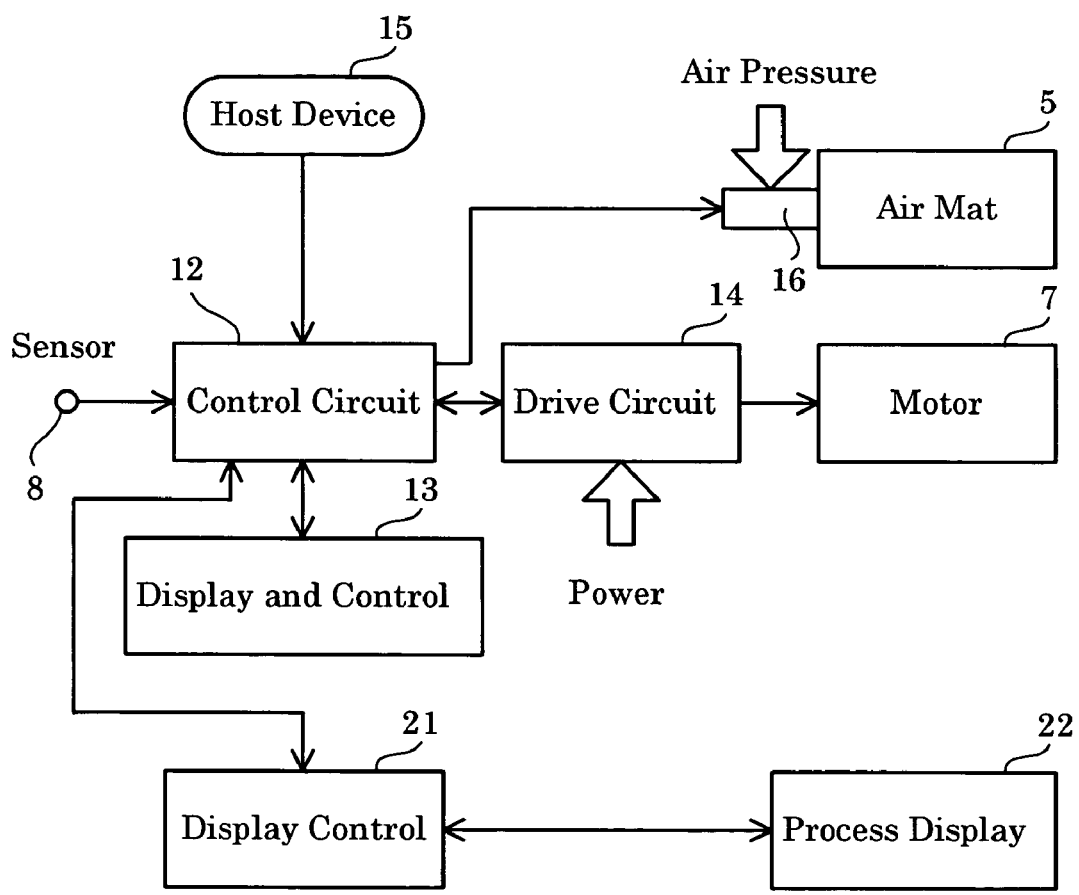
FIG. 9 shows a block configuration diagram illustrating an electrical system of a device according to an embodiment of the present invention comprising a process display device.

FIG. 9 is a block configuration diagram illustrating an electrical system of a device according to an embodiment of the present invention comprising a process display device. The device of this embodiment comprises, in addition to the configuration shown in FIG. 4, process display device 22 as one or a plurality of optical display means set up in the vicinity of disc 1, and display control section 21 controlling process display device 22 so as to display information relating to operating processes and reading in output signals of sensor 8 and controlling process display device 22 so as to display motion position information of disc 1. Display control section 21 is connected to control circuit 12.

A plurality of process display devices 22 are each disposed at advantageous angles so as to be visible not only to a person working on disc 1 but also to a person working in other operation areas. Furthermore, a portion of a display screen of process display device 22 is provided with a touch panel area either to realize a portion of the functionality of display and control panel 13 or to facilitate operation independent of display and control panel 13.

Process display device 22 is connected to display control section 21 and controlled thereby. That is to say, the display of the display screen of process display device 22 is controlled in real time by display control section 21, and an operation input from the touch panel set up in a portion of that display screen is read into display control section 21 in real time.

Figure 10:
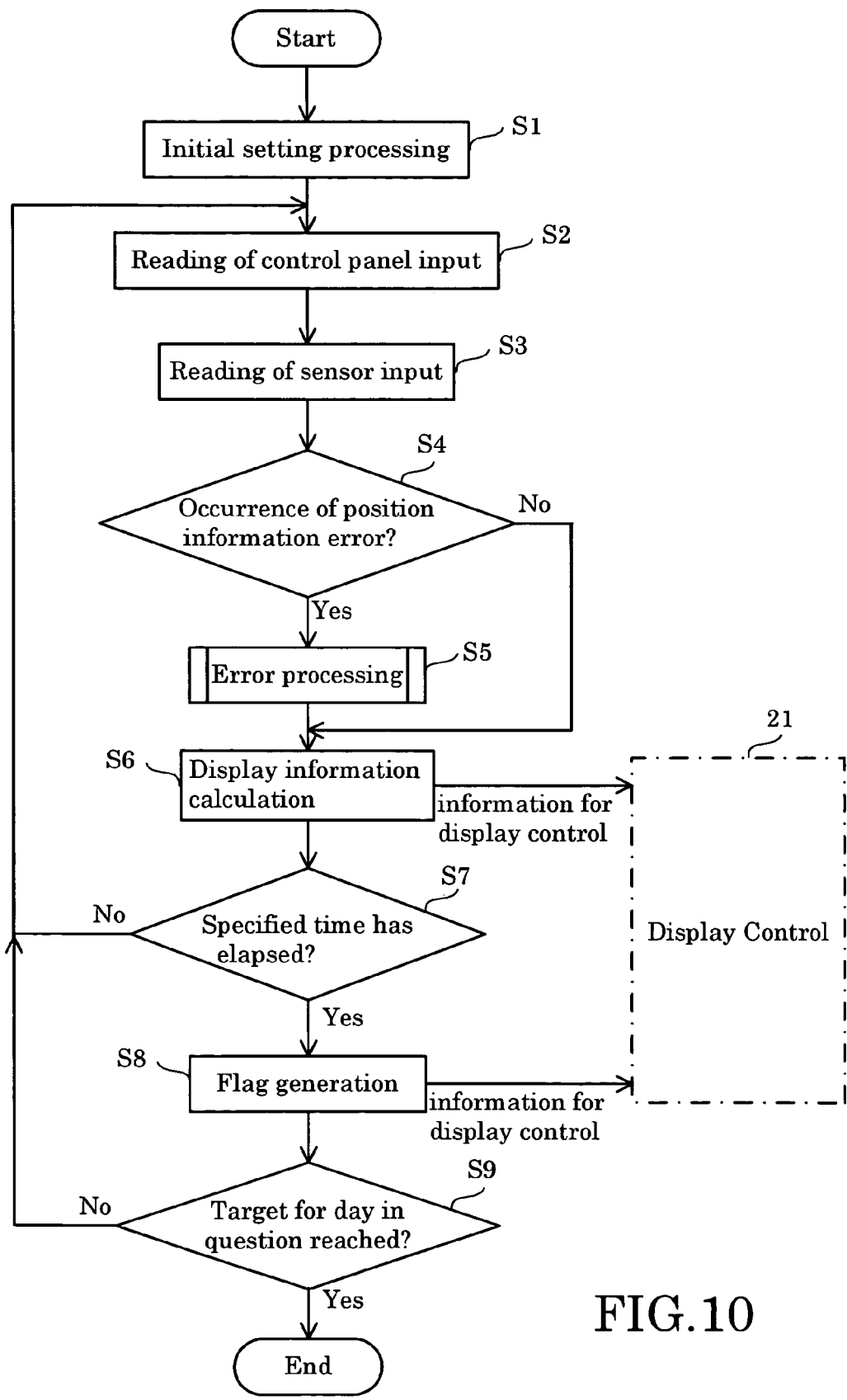
FIG. 10 shows a flowchart of a portion of control relating to process display performed by a control circuit.

FIG. 10 is a flowchart of a portion of control performed by control circuit 12 in relation to process display. To briefly explain this control flowchart, an initial setting process (S1) is carried out in accordance with the specifications of the model to be assembled next on disc 1. For example, if that model has standard specifications in terms of all modules, the rotation speed of disc 1 is set to remain fixed at a standard speed. If it is assumed that that model has specifications requiring mounting of an engine including additional specifications, and that a large number of man-hours are required for engine mounting operations, initial setting of the program is carried out at this time such that the rotation speed of disc 1 becomes temporarily lower when the engine is delivered from the module supply area. If it is assumed with regard to the model undergoing assembly work that the specification thereof does not require mounting of a portion of fuel tanks, assembly of a portion of electrical fittings, or fitting of a portion of other devices, the man-hours for that process will reduce, and therefore, the control program is set such that the rotation speed of disc 1 becomes temporarily higher when this process is being carried out.

The input data from display and control panel 13 and the input data from sensor 8 of disc 1 are read in (S2, S3), and rotation of disc 1 at the set speed thereof is started. When operations are proceeding as expected, input from display and control panel 13 is confirmation data from a worker. When a worker identifies a problem such as a delay in a delivery of a portion of components or modules, this can be input from display and control panel 13. Then, control circuit 12 reads in rotation position information from sensor 8 of disc 1, and while confirming whether rotation is occurring in line with control (S4, S5), outputs the corresponding rotation angle and position information to display control section 21 (S6), and display control section 21 displays that on the screen of process display device 22. This is repeated (S7) until a specified time has elapsed, and when the specified time has elapsed, a flag is generated and displayed (S8) on the screen of process display device 22 through display control section 21. This is repeated (S9) as far as the scheduled volume for the day in question.

Figure 11:
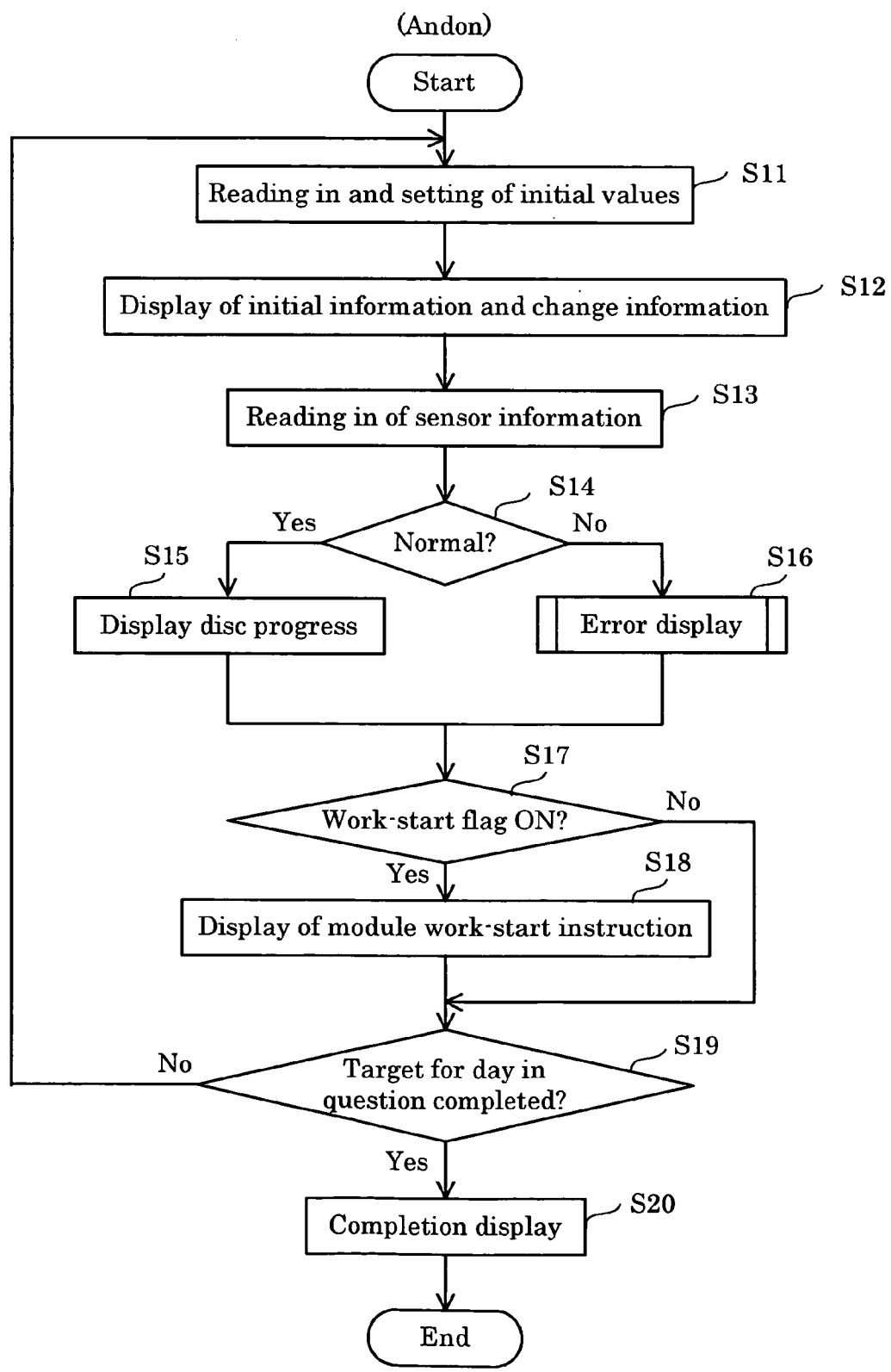
FIG. 11 shows a control flowchart of a display control section.

As process display device 22 is adjusted so as to provide a dim display of a level not inconveniencing a worker during the operation thereof, plant workers have given this the name "andon". FIG. 11 is a control flowchart of display control section 21. When display control section 21 begins operation, reading in and setting of initial values are carried out (S11), and these are displayed on process display device 22 (S12).

Next, sensor information is read in (S13), and a judgment of whether or not this is normal for the start of control is made (S14). If normal, the progress of disc 1 is displayed (S15). If abnormal, details of that abnormality are displayed (S16). The condition of a work-start flag is read in (S17), and if this is "Work Start", a work-start instruction is displayed (S18). This display is repeated (S19) each period of rotation of disc 1 until the scheduled volume for the day in question has been completed. When the scheduled volume has been completed, completion is displayed (S20).

Figure 12:
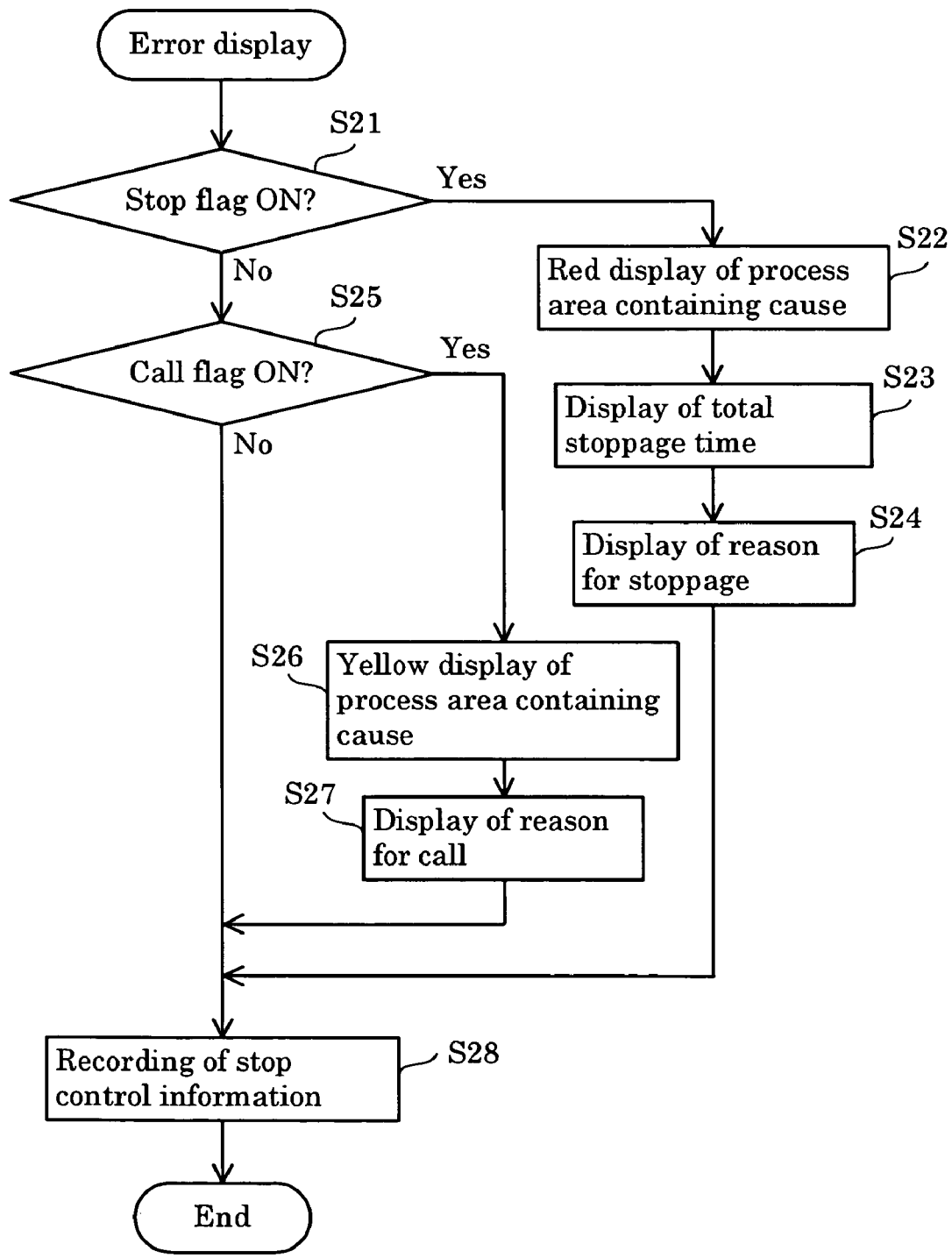
FIG. 12 shows a control flowchart of an abnormality display.

An example of a display control procedure relating to abnormality display is shown in FIG. 12. Here, abnormality display is performed with color-coding based on the level of urgency. Furthermore, in a case where disc 1 has been stopped (S21), the area of the process constituting the cause thereof is displayed in red (S22), the corresponding stop time is automatically totaled and displayed (S23), and in addition, a cause-specific stoppage reason is displayed (S24). In the case of abnormalities of a lesser level than stoppage of disc 1 but requiring that a manager be called (S25), the area constituting the cause thereof is displayed in yellow (S26), and the corresponding reason for calling is displayed (S27). Furthermore, all of these displays are stored together with time information in a memory circuit (S28). Operations can be performed to read in these records as required.

Figure 13:
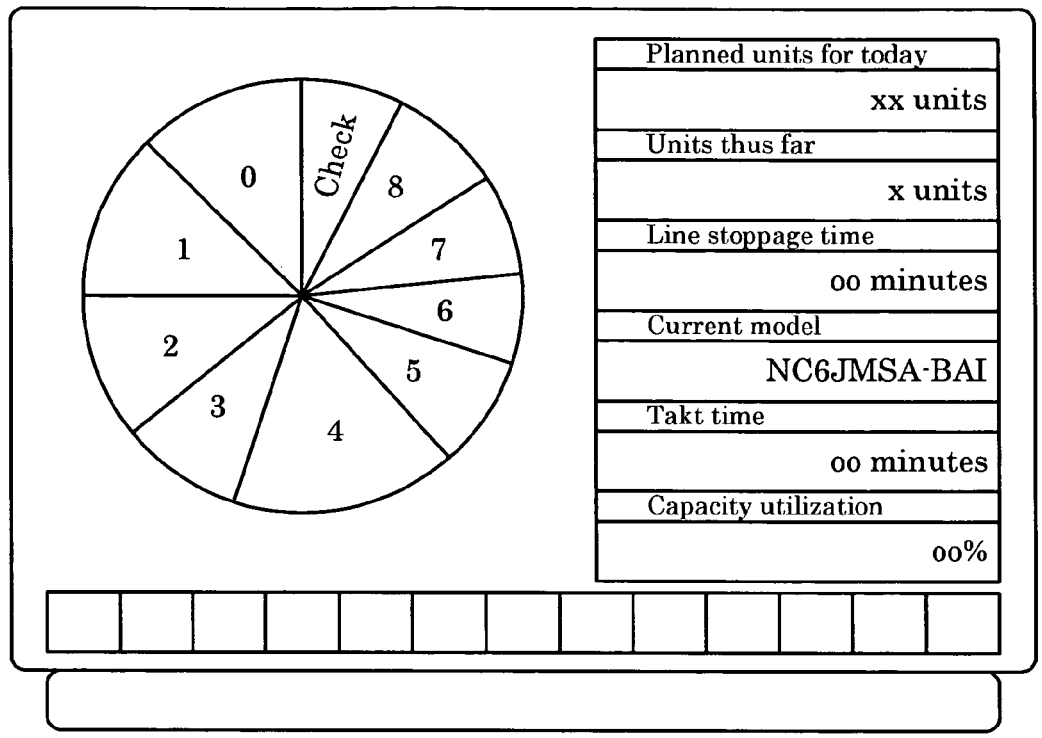
FIG. 13 shows an example of a display screen when in a steady state.

FIG. 13 is an example of a display content of a display screen of process display device 22. This screen is an example of a display screen when in a steady state, and the figure displayed as a circle in the left half shows the current angle of rotation of disc 1. The numbers inside the circular shape indicate the areas wherein the process operations are being carried out. This circular shape is shown filled in green in accordance with the angle of rotation of disc 1. The rotation angle of disc 1, or in other words, the state of progress of these operating processes, is displayed to the level of detail sufficient to allow recognition of an angle resulting from division of one rotation into 60 equal parts (or between 12 and 120 equal parts). Displayed in the fields on a right side of the screen are "Planned units for today", "Units so far", "Total line stoppage time", "Current model", "Takt time", "Capacity utilization", and the like. Of these, "Current model" is a code displayed on a sign of the so-called Kanban system. Based on the corresponding plurality of letters and numbers, workers carrying out the various assembly operations can identify the type of component to be mounted or details of the operation thereof. Characters related to reasons for stoppage, etc. are displayed in the various frames of a bottom row. Display is carried out in red in these fields upon the occurrence of an abnormality.

Figure 14:
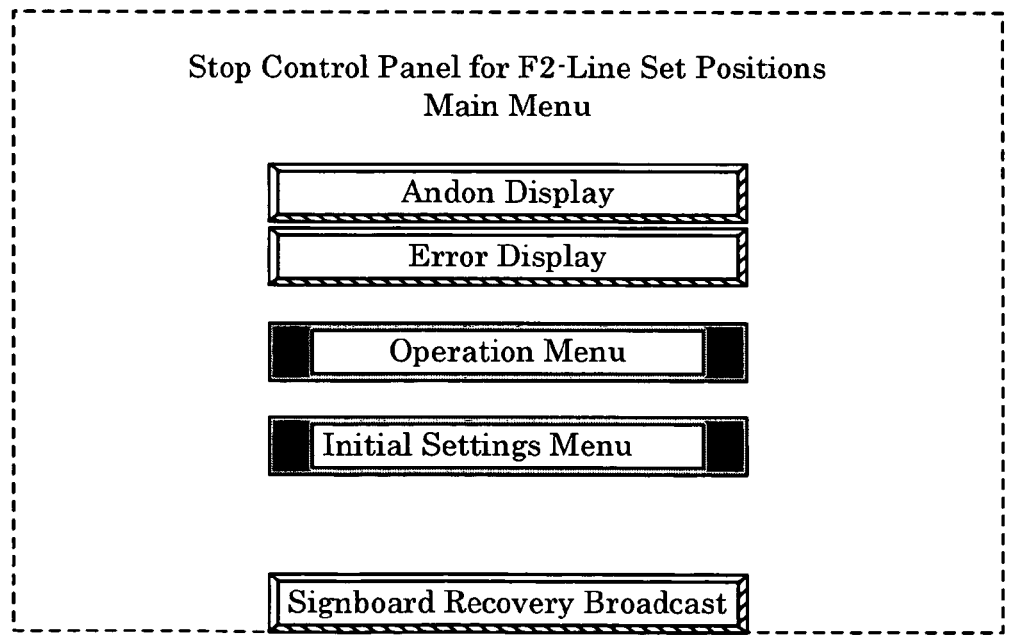
FIG. 14 shows an example of a main menu display screen in input mode.
Figure 15:
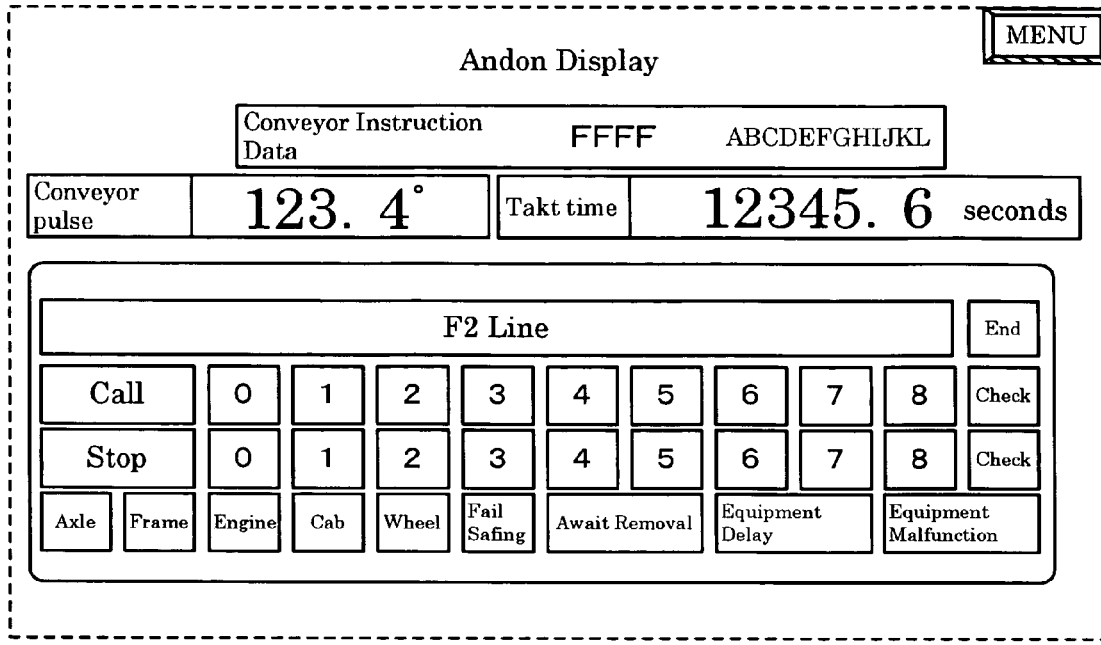
FIG. 15 shows an example of a current-status display screen.
Figure 16:
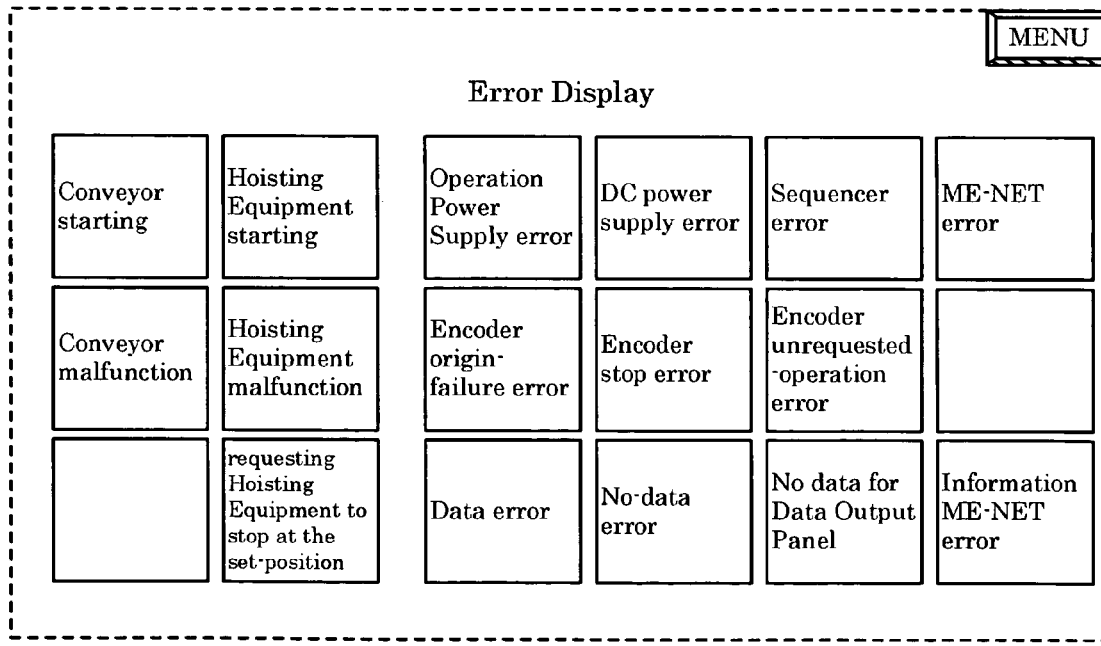
FIG. 16 shows an example of an abnormality display screen.

FIG. 14 is a screen display in a situation where input operations are performed from process display device 22. When this screen is displayed, display content can be operated and selected by touching inside the corresponding frames with a finger tip. FIG. 15 is an example of a display of status information relating to a point in time as operating processes proceed. By touching "MENU" at the top right with a finger tip, an operation can be performed so as to return to the menu screen displayed as an example in FIG. 14. FIG. 16 is an example of a screen display selected upon an abnormality such as stoppage of disc 1.

It should be noted that the display content shown in FIG. 13 can be enlarged and projected onto a screen installed within the plant in an easily seen location not obstructing operations such that a worker of the rotating assembly stand or a module supply area can easily identify the current situation.

In this embodiment, therefore, when the speed of conveyance (speed of transportation or timing of transportation) of rotating disc 1 is set in a variable manner, workers can correctly identify this and can perform reasonable time allocation with little waste and advance operations. As a result of the use of this process display device, individual workers carrying out processes can correctly identify the overall situation and perform operations, and therefore, actions are optimized without instructions having to be received one by one, and overall, process stoppage time is reduced and operation effectiveness is improved. By using this device, worker fatigue is reduced and operation efficiency is improved. From this display content, workers can identify overall conditions and advance operations. Display content is automatically saved as is as records in a database, and this can prove useful later on when properly resolving inconvenient problems having occurred in a process.

Although the above explained an example of usage of a disc-shaped item presented as a means for conveyance in Embodiment 1, the same process display can also be carried out for a straight-line or curve shaped means for conveyance.

The invention claimed is:
1. An assembly method for a motor vehicle comprising:
disposing one workpiece to be assembled into a motor vehicle on a rotating assembly stand,
advancing an assembly operation of the workpiece while delivering a module onto the rotating assembly stand from a module supply area set up at a circumference of the rotating assembly stand, and
performing an assembly operation of the workpiece to a prescribed level during one of a plurality of prescribed rotation speed modes of the rotating assembly stand, wherein the rotation speed modes are programmed in accordance with specifications of an individual motor vehicle being assembled and is selected during conveyance of the workpiece on the rotating assembly stand and the mode is controlled during the course of one rotation based on the specification of the motor vehicle.
2. The assembly method of claim 1, wherein the rotating assembly stand is disc shaped.

* * * * *